(12) United States Patent
Woortman et al.

(10) Patent No.: US 7,833,356 B2
(45) Date of Patent: Nov. 16, 2010

(54) METHOD FOR PREPARING A GELLABLE STARCH PRODUCT

(75) Inventors: Albert Jan Jacob Woortman, DA Veendam (NL); Petrus Anthonius Maria Steeneken, WB Groningen (NL)

(73) Assignee: Cooperatie AVEBE U.A., JA Veendam (NL)

( * ) Notice: Subject to any disclaimer, the term of this patent is extended or adjusted under 35 U.S.C. 154(b) by 1352 days.

(21) Appl. No.: 10/543,002

(22) PCT Filed: Feb. 10, 2004

(86) PCT No.: PCT/NL2004/000093

§ 371 (c)(1),
(2), (4) Date: Jan. 5, 2006

(87) PCT Pub. No.: WO2004/069877

PCT Pub. Date: Aug. 19, 2004

(65) Prior Publication Data

US 2006/0225731 A1     Oct. 12, 2006

(30) Foreign Application Priority Data

Feb. 10, 2003   (EP)   ................................. 03075387

(51) Int. Cl.
*C08B 30/14*     (2006.01)

(52) U.S. Cl. .................... 127/71; 127/32; 106/206.1

(58) Field of Classification Search .................. 127/71, 127/32; 106/206.1
See application file for complete search history.

(56) References Cited

U.S. PATENT DOCUMENTS

| | | | | |
|---|---|---|---|---|
| 3,630,775 A | * | 12/1971 | Winkler | ........................ 127/71 |
| 3,951,947 A | * | 4/1976 | Schanefelt et al. | .......... 536/106 |
| 5,188,674 A | | 2/1993 | Kasica et al. | |
| 5,547,513 A | | 8/1996 | Mallee et al. | |
| 5,788,674 A | * | 8/1998 | McWilliams | ................. 604/141 |

OTHER PUBLICATIONS

Nordmark et al, "Spherulitic crystallization of gelatinized maize starch and its fractions", Carbohydrate Polymers 49 (2002), pp. 439-448.*
Lorenz et al., "Handbook of Cereal Science and Technology," 1991, pp. 233-237. Marcel Dekker, Inc., New York, New York.
Endres et al., "Grain Sorghum (MILO) Production Guidelines," 2000, pp. 1-4. http://www.ag.ndsu.nodak.edu/carringt/agalerts/milo.htm.

* cited by examiner

*Primary Examiner*—David M Brunsman
(74) *Attorney, Agent, or Firm*—Hoffman & Baron, LLP

(57) ABSTRACT

The present invention relates to a method for preparing a starch product, wherein an aqueous starch mixture containing 5-50% dsb amylose is provided and the starch mixture is heated to a high temperature of at least 170 C. The invention further relates to a product obtainable by such a method and to the use of such product in a variety of food applications.

29 Claims, 2 Drawing Sheets

Figure 2A (Paselli SA2™)

Figure 3 (gel according to Example V)
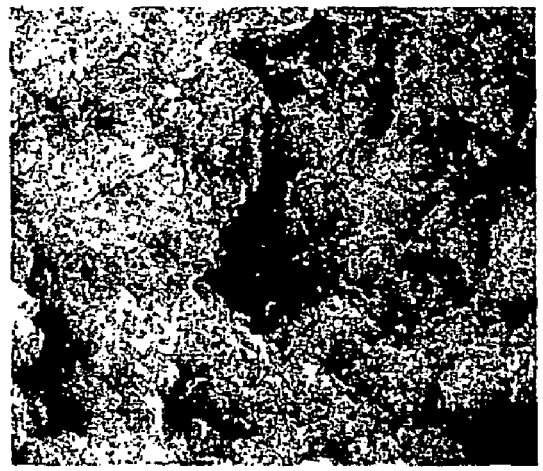
Figure 4 (gel according to Example VI)
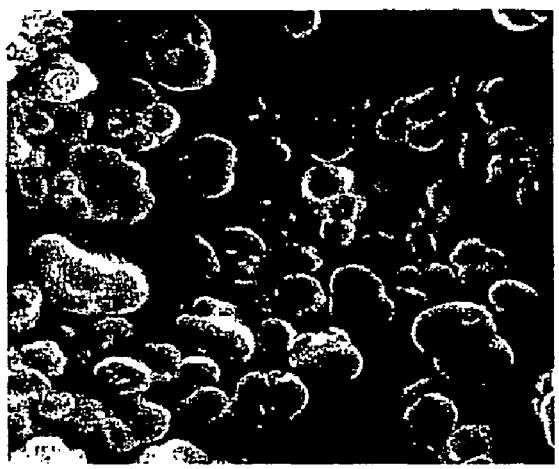
Figure 5 (gel according to Example VII)
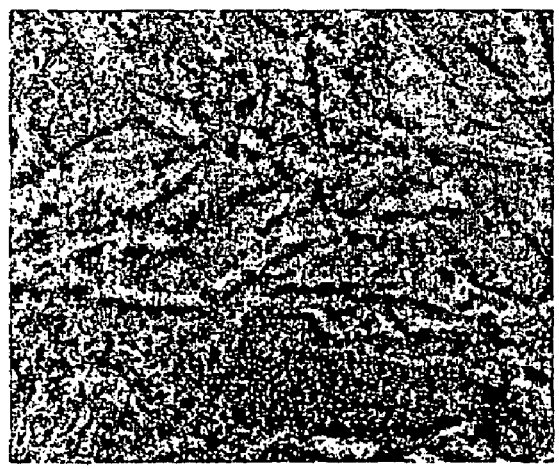

METHOD FOR PREPARING A GELLABLE STARCH PRODUCT

This application is the U.S. National Phase of International Application Number PCT/NL2004/000093 filed on 10 Feb. 2004, which is incorporated herein by reference.

BACKGROUND OF THE INVENTION

The invention relates to a method for preparing a starch product, to a starch product obtainable by such process and to the use of such a starch product.

It is known in the art to prepare a starch product suitable as a texturising agent by subjecting high amylose starch to specific conditions of e.g. temperature, shear, pressure and pH.

U.S. Pat. No. 5,188,674 relates to a process for jet-cooking and spray drying a polymer to recover a dried substantially amorphous polymer powder that is water soluble or water dispersible. The process may involve the recovery of a starch powder, preferably a high amylose starch powder. It is described that the cooking temperature should not be too high in order to avoid degradation of the polymer, in particular in case the polymer is starch. According to U.S. Pat. No. 5,188,674, the cooking temperature should be less than 162° C. in case that amylose content is less than 40%. No process is described, wherein an at least partially crystallised starch product, e.g. containing spherulites, is recovered.

U.S. Pat. No. 5,131,953 relates to a pregelatinised spray-dried non-granular non-crystalline, non-retrograderd starch powder containing more than 40% amylose. The powder may be obtained as described in U.S. Pat. No. 5,188,674.

However, a need remains for alternative methodologies, that may be used to prepare starch products with interesting properties for a variety of purposes.

SUMMARY OF THE INVENTION

It has now been found that by subjecting a starch with less than 50% amylose to a specific temperature program a gellable product can be obtained with interesting properties for e.g. food applications.

Accordingly the present invention relates to a method for preparing a starch product, wherein an aqueous starch mixture—typically in the form of a suspension—is provided, which starch mixture comprises water and starch, the starch containing amylose in a content of less than 50 wt. % based on the dry substance; and the starch mixture is heated to a temperature of at least 170° C.

A method according to the invention offers an easy way of preparing a gellable starch product, with interesting properties such as good spreadability, a short induction time of gelation and/or a good gel stability.

An advantage of a method according to the invention is the suitability to process unmodified starch into a product that can be classified as unmodified starch, which is required or at least preferred for many food grade applications.

BRIEF DESCRIPTION OF THE DRAWINGS

FIGS. 2A and 2B show a phase contrast photomicrograph of respectively a 20% gel according to the invention (2B) and a 20% gel of Paselli SA2™ (2A).

FIGS. 3 and 4 show photomicrographs of spreadable gels of gellable starch product prepared without storage at room temperature according to Example V ((high-modulus type), FIG. 3), prepared with overnight stirring at room temperature according to Example VI (spherocrystalline instant-type, FIG. 4)

FIG. 5 shows a rubber-like non-spreadable gel is obtained after heating suspension of gellable spherocrystalline instant-type starch product at 140° C., cooling and storage according to Example VII.

DETAILED DESCRIPTION OF THE INVENTION

Figure 1:
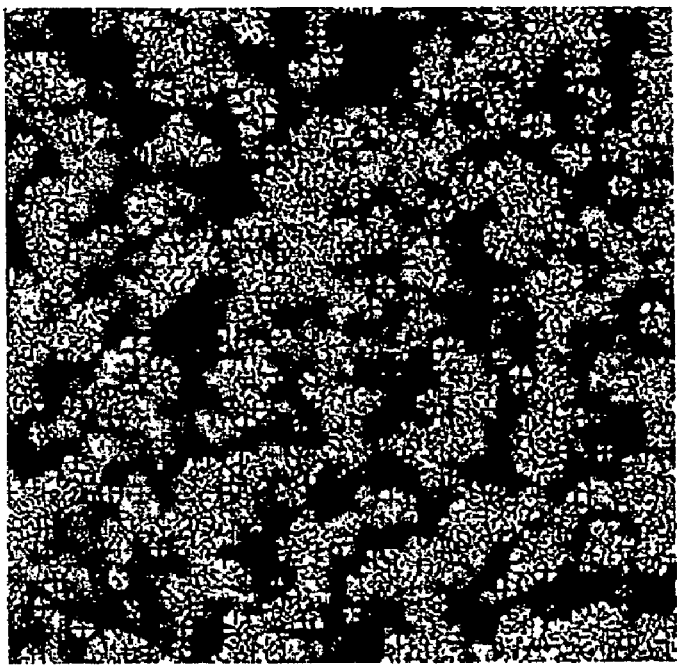
FIG. 1 shows a photomicrograph (crossed polars) of a gelled product according to the invention, containing spherulites.
Figure 1:
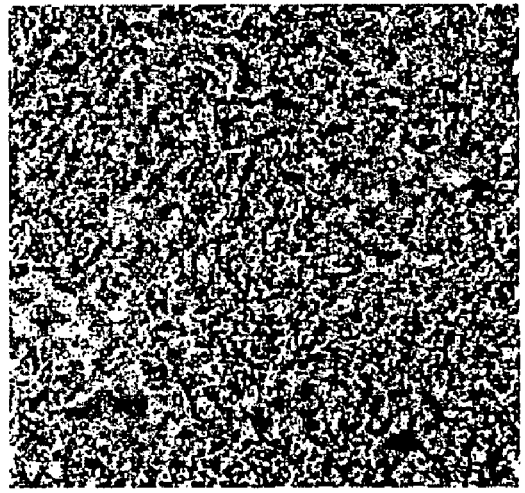
Figure 2B:
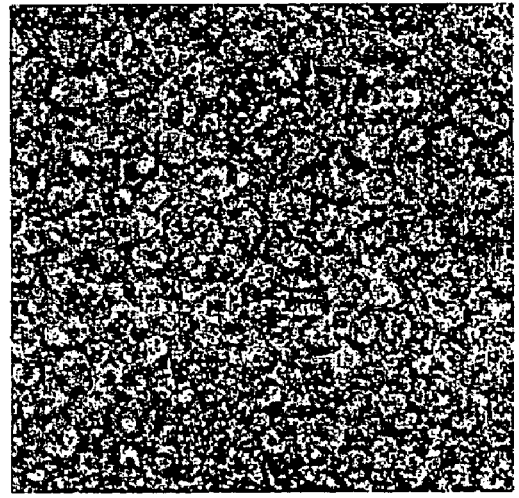

The starch may be starch from any natural or genetically modified botanical source. Preferred starches are cereal starches, root starches and tuber starches. Very good results have been achieved with tuber starch, in particular with potato starch. Optionally the starch is modified before heating the suspension, e.g. by chemical, enzymatic and/or physical modification. Suitable examples of chemical modifications include mild degradation by acid and acetylation of starch.

The amylose content of the starch is preferably less than 45 wt. % based upon the dry weight, more preferably less than 40%, based upon the dry weight, even more preferably less than 35 wt. % based upon the dry weight. Very good results have been obtained with a starch comprising up to 30 wt. % based upon the dry weight. Usually, the content of amylose in the starch is more than 5 wt % based upon the dry weight. Preferably the amylose content is more than 10 wt. % based upon the dry weight. More preferably the amylose content is at least 15 wt. % based upon the dry weight. Very good results have been obtained with a starch comprising at least 20 wt. % amylose based upon the dry weight. The balance of the dry substance of the starch is typically formed by components usually present in starch, in particular amylopectin and optionally some lipids and/or proteins.

The water in the starch mixture may be any kind of water suitable for preparing a food-grade product. Although it is possible to use distilled or demineralised water, satisfactory results have been achieved with tap water. The water is optionally supplemented with one or more additives, for example one or more pH modifiers.

The ratio starch to water of the starch mixture at the beginning of the heating is not particularly critical. Preferably, the starch to water ratio is at least 5:95 (wt/wt), more preferably at least 10:90. For practical reasons, the starch to water ratio is typically less than 70:30, preferably less than 50:50. For obtaining a product comprising spherulites with highly satisfactory gelling properties, very good results have been achieved with starch mixture having a starch to water ratio of up to 40:60, more in particular between 10:90 and 40:60.

The starch mixture typically has an acidic pH, at least at the beginning of the heating. The pH may be brought to a desired value by adding a strong and/or a weak acid (buffering agent). Optionally a desired pH is at least partially effected by the starch itself, e.g. when a acidic starch is used or a derivatised starch is used that releases acidic groups during the heating (e.g. acetylated starch which releases acetyl-groups during the heating).

The pH of the aqueous starch mixture (as measured at 25° C.) is preferably less than 6.5, more preferably less than 6. The pH is usually at least 2, preferably more than 4, more preferably at least 5.

The aqueous starch mixture is heated to a temperature of at least 170° C., preferably to a temperature between 175 and 250° C., more preferably to a temperature between 180 and 220° C. for a duration sufficient to allow a substantial disruption of starch granules; preferably until substantially all starch granules are disrupted (to form gelatinised starch), more preferably unit substantially all starch molecules are dissolved to form a starch solution.

A suitable heating time can be determined routinely based upon the information disclosed herein and common general knowledge. It may for example be suitably chosen in the range of 30-600 sec, preferably in the range of 60-300 sec, more preferably in the range of 100-200 sec.

Between heating and the next step, the heated aqueous starch mixture (which is preferably a solution at the end of the heating step) may be purified, e.g. by filtration. However, very good results have been achieved without such purification (e.g. filtration) of the heated starch mixture between heating and the next step.

It has been found that by further processing the heated aqueous starch mixture in a specific way, different kinds of products are obtained with interesting properties. Typical examples of further process steps include cooling of the starch mixture, drying the starch mixture and crystallising at least part of the starch in the starch mixture. Further, the product may be subjected to an additional heating step, in case of a dried product preferably after having been redissolved.

After the heating step, the aqueous starch mixture (preferably a solution) is typically cooled, eventually preferably to a temperature of 0-100° C., more in particular to 0-50° C. The skilled person will be able to employ suitable cooling rates based upon the information disclosed herein and general common knowledge. Good results have for example been obtained with cooling rates in the range of 5-200° C./min, more in particular in the range of 40-100° C./min.

Crystallisation is typically effected by cooling and/or by (spray)-drying the heated starch mixture (in particular the starch solution). In a preferred process, starch spherulites (i.e birefringent crystals) are formed during the crystallisation.

Drying may be effected in any way, e.g. by precipitation (typically in ethanol), lyophilising or spray-drying.

It has for example been found possible to prepare a starch product with a relatively high dynamic storage modulus, typically of at least 10 000 Pa, preferably of at least 30 000 Pa for a product comprising 20 wt. % starch in water as measured by oscillatory shear rheometry, by heating the starch mixture as described above and thereafter starting to dry the resultant heated starch mixture, whilst the starch in the mixture still is essentially uncrystallised (as described in K. Svegmark, A. M. Hermansson: Shear induced changes in the viscoelastic behaviour of heat treated potato starch dispersions. Carbohydr. Polym., 13, (1990), 29-45). To this effect, the heated aqueous starch mixture (in particular a solution) may be dried without first cooling the product at all or to cool it to a temperature at the beginning of the drying step of at least 20° C., preferably of at least 50° C., more preferably of between 70 and 100° C. For obtaining a product with a relatively high modulus, it has been found advantageous to dry the (cooled) aqueous starch mixture without any substantial storage. More in particular, the storage is typically less than 30 min, preferably 0-15 min, in this embodiment.

Very good results have been achieved with a method wherein the drying is realised by spray drying. Optionally, the heated starch mixture is diluted, e.g. to obtain a solution of 5-10 wt % starch in water, before being dried.

In a method wherein the starch is spray-dried, a product is obtained that forms a thermo-reversible gel with a relatively high modulus when contacted with water. Such a high modulus product has been found very suitable for application as a fat replacer, in particular in a spread, or as a caseinate replacer, in particular in imitation cheese. Further, such a high modulus product has been found suitable as a transparent or opaque film with good moisture barrier properties (e.g. comparable to gelatin). It may for example be suitably applied to a surface of a foodstuff by solution casting a composition of the starch product in water to the surface. Such a high modulus product has also been found very suitable as an expansion aid for a food stuff or as a chocolate grating. In addition, such a high modulus product may be used as a thermoreversible gelling starch product.

In an alternative method according to the invention, it has for example been found possible to prepare a spreadable starch product, which has been found very suitable in an application wherein instant gelling or texturising is required or desired. Such a method comprises subjecting an aqueous starch mixture, in particular a suspension, to a heating step as described above and thereafter cooling the starch product before optionally drying it. The cooling is preferably carried out to a temperature of 100° C. or less, more preferably to a temperature in the range of 10-50° C. Then the cooled starch mixture is preferably stored for at least 30 min, preferably up to 50 hours, more preferably for 12-36 hours, before optionally being dried, e.g. by spray drying. During storage, at least part of the starch typically crystallises to form spherulites. The storage may be carried out without agitating the starch product. For practical reasons, in particular on a large production scale, the storage usually takes place under some motion of the starch product. A thus obtained starch product has been found to have an attractive ointment-like character.

After storage, the product may be suitably dried or directly further processed, e.g. used in a foodstuff. Drying is for example carried out by precipitation of the starch in an organic liquid, such as ethanol, by lyophilisation, by roll-drying or by spray-drying. For practical reasons, spray drying is preferred. Thus, a dried starch product is obtained that is instant gellable, i.e. suspendable in cold water (e.g. of about 15-30° C.) to form a gel. Such a gel has been found to have good spreading characteristics. It can for example readily be spread on a sandwich. A particular advantage of an instant gellable product in accordance with the invention is the capability to form a gel in cold water, without lumps.

A spreadable starch product which is thus obtainable has been found to be very suitable in a variety of spreadable foodstuffs. For example, it may serve as a caseinate replacer in imitation cheese, as a thickening agent in e.g. sauces, spreads and the like, as a fat-substitute e.g. in low-fat ice-cream or chocolate spread.

A method according to the invention may further comprise additional steps to further alter the characteristics of the starch product. For example the texture of a starch product, in particular a spreadable starch product may be smoothened, e.g. with high-speed mixer (e.g. an Ultra-Turrax), or a colloid mill or homogeniser, which leads to a reduction of the dynamic shear modulus For some purposes it is advantageous to suspend a starch product obtainable in accordance to the invention, in particular a spreadable product containing spherulites and subject the suspension to a heating step to obtain a rubbery, non-spreadable gel. The temperature is preferably raised to a temperature at which starch crystals, in particular spherulites, irreversibly dissolve. The chosen temperature is typically at least 80° C., preferably about 120-180° C., more preferably about 130-150° C. Thus a rubbery gel-like product is obtained, which may be used as a carrageenan replacer. Such a product has also been found to be very satisfactory in UHT foodstuffs e.g. to form a smooth cuttable pudding that is stable a room temperature.

A method according to the invention has been found to be very suitable to be carried out in a continuous way or in a partially continuous way. In particular the heating step is preferably performed continuously, more preferably in a jet-cooker.

The present invention further relates to a starch product, obtainable by a method according to any of the preceding claims. Examples of such a product in particular include gellable starch powders, thermoreversible starch gels, spreadable gels and rubber-like starch gels.

A thermoreversible gel according to the invention typically has a melting temperature below 125° C., preferably below 100° C.

The weight average molecular weight ($M_w$) of the starch molecules in the product may be in the range of 10 000-25.10$^6$ g/mol. preferably $M_w$ is at least 50 000 g/mol, more preferably at least 100 000 g/mol. $M_w$ is preferably less than 18.10$^6$ g/mol, more preferably less than 10.10$^6$ g/mol. $M_w$ as used herein is the value as is determinable by SEC-MALLS-RI (size exclusion chromatography-multi angle laser light scattering-refractive index detection) with as an eluent DMSO/0.1 M aqueous $NaNO_3$ (90/10 v/v) on a PLGel Mixed-D/Mixed E column at 95° C., as described in S. H. Yoo, J. L. Jane. Molecular weights and gyration radii of amylopectins determined by high-performance size-exclusion chromatography equipped with mult-angle laserlight scattering and refractive index detectors. Carbohydr. Polym., 49, (2002), 307-314.

Of a gellable product according to the invention, it has been found that it contains a relatively high amount of amylase-resistant starch. Amylase-resistant starch is defined as starch that is not digestible by pancreas amylase at 37° C. and pH 5.2, as determined by the Englyst method (3. H. N. Englyst, S. M. Kingman, J. H. Cummings. Classification and measurement of nutritionally important starch fractions. Eur. J. Clinical Nutr., 46 (Suppl.2), (1992), S33-S50)

Preferably the non-degradable (i.e. resistant) starch content is less than 40 wt. %, based upon the dry substance, more preferably 1-40 wt. %, even more preferably between 15 and 30 wt %.

The present invention further relates to a foodstuff comprising a starch product in accordance with the invention. Examples of such foodstuffs include snacks, desserts (in particular instant desserts, low-fat desserts and cuttable puddings), imitation cheeses, chocolate and chocolate substitutes, low-fat spreads, low-fat margarine, cold-process spoonable products and sauces.

A product according to the invention is very suitable to form a film, e.g. on a food stuff, which film acts as a moisture barrier.

The present invention further relates to the use of a starch product as describes herein as a gelling agent, a texturising agent, a moisture barrier, a fat substitute or an expansion aid.

When used as a gelling agent the amount of starch product is preferably at least 3 wt %. For such purpose, the starch may for instance be used in a low-fat margarine or a cuttable pudding, e.g. in a concentration of about 5 wt. % based on the dry product Very good results as a fat-replacer have been achieved in concentration of up to 20 wt %.

The invention is now further illustrated by the following examples.

Example I

A 20 wt % (dry matter basis) potato starch suspension in distilled water was prepared in a stainless steel DSC cup. After hermetically sealing the cup, the suspension was heated in a DSC instrument to 190-210° C. at a heating rate of 10° C./min, and thereafter quench-cooled (200° C./min) to room temperature. After direct opening of the cup, a clear solution was obtained. After overnight storage of this solution at room temperature, a gel with a greasy texture was obtained. Microscopically, this gel consisted of birefringent spherulites. Heating the gel so obtained in a hermetically sealed cup in a DSC instrument gave a melting transition between 35 and 90° C. with a peak temperature of 63° C. This melting transition could be recovered in the same gel after overnight cooling at 4° C. (This example demonstrates the spherocrystalline and thermoreversible nature of gels obtained from aqueous starch heated to >170° C.).

Example II

A 20 wt % (d.m. basis) potato starch suspension in demineralised water was gelatinised at 100° C., then heated in a hermetically sealed stainless steel cylinder in an air oven adjusted so as to give a temperature rise of the suspension to 185° C. at 10° C./min, and quench-cooled in two steps to room temperature. After overnight storage of the clear solution at room temperature, a gel with spherulite texture was obtained. A gellable starch product in powder form was obtained (a) by dehydrating the gel by freeze drying, or (b) by diluting the gel with some water to obtain a pourable gel suspension, which was precipitated by adding the suspension to 10 volumes of ethanol with stirring, and vacuum-drying the ethanol-washed precipitate. A 20 wt % (d.m. basis) suspension of the dried gellable starch product in demineralised water was heated to 100° C. and loaded into a dynamic spectrometer thermostatted at 20 or 4° C., in order to follow the dynamic storage modulus G' as a function of time. After 16 h at 20° C., G' attained 14100 Pa with zero induction time (where induction time is defined as the time required to develop a value of G' significantly different from 0). After 16 h at 4° C., G' attained 58600 Pa with zero induction time. For a 20 wt % (d.m. basis) aqueous potato maltodextrin (Paselli SA2) gel prepared in the same way, G' values after 16 h were 2300 (20° C.) and 23000 Pa (4° C.), whereas induction times were 3.3 and 0.4 h, respectively. (This example demonstrates the preparation of a gellable starch product and its gelling ability.)

Example III

A dry gellable starch product was made according to Example II. A 20 wt % (d.m. basis) suspension of this starch products in demineralised water was prepared at room temperature and loaded into a dynamic spectrometer thermostatted at 20 or 4° C., in order to follow the dynamic storage modulus G' as a function of time. After 16 h at 20° C., G' attained 5500 Pa with zero induction time (where induction time is defined as the time required to develop a value of G' significantly different from 0). After 16 h at 4° C., G' attained 22200 Pa with zero induction time. A 20 wt % (d.m. basis) Paselli SA2 gel prepared at the same conditions did not exhibit instant properties. (This example demonstrates the instant character of the gellable starch product.)

Example IV

Dry gellable starch products were made according to the general method described in Example II, based on waxy maize starch (0% amylose), tapioca starch (17% amylose), potato starch (21% amylose), normal maize starch (26% amylose), and high-amylose maize starch (63% amylose). Final heating temperature is listed in the Table below. Suspensions of the dried gellable starch product in demineralised water were heated to 100° C. and loaded into a dynamic spectrometer thermostatted at 20° C., in order to follow the dynamic storage modulus G' as a function of time. The dynamic storage modulus G' after 16 h storage and the weight average molar weight Mw of the resulting gels are listed in Table I. (This example demonstrates the effect of starch type on gelling properties).

TABLE I

|  | Gel concentration | Final heating temp in making gellable starch product (° C.) | | | |
|---|---|---|---|---|---|
|  |  | 180 | | 190 | |
| Starch | (wt %) | G' (Pa) | Mw (×10⁶)) | G' (Pa) | Mw (×10⁶) |
| Waxy maize | 20 | 0 | | 0 | |
| Maize | 20 | 6500 | 16.5 | | |
| HA-maize | 10 | 5100 | 3 | 21000 | 1.5 |
| Tapioca | 30 | 220 | 3.9 | | |
| Potato | 20 | 14100 | 2.3 | 16800 | 0.68 |

Example V

A 20 wt % (d.m. basis) potato starch suspension in tap water was prepared and adjusted to pH 5.5. The suspension was jet-cooked at 180° C. for 160 s, and the hot starch solution was directly fed into a spray-drier to make a dry gellable starch product. This product had an aggregate-type morphology (see FIG. 3). Suspensions of this dried gellable starch product in water 10° DH were either heated to 100° C. and loaded into a thermostatted dynamic spectrometer, or directly loaded in to the spectrometer, in order to follow the dynamic storage modulus G' at a temperature specified in Table II. The dynamic storage moduli G' as a function of time are listed in Table II. (This example demonstrates the manufacture and the gelling properties of non-crystallised, directly spray-dried gellable high-modulus type starch product).

TABLE II

| Starch | Conc (%) | Treatment[b] | Storage temp (° C.) | G' (Pa) as function of storage time | | |
|---|---|---|---|---|---|---|
|  |  |  |  | 0 h | 2 h | 16 h |
| GSP[a] | 8 | Cook-up | 4 | 0 | 7 | 950 |
|  | 10 | Cook-up | 4 | 0 | 976 | 5130 |
|  | 10 | Cook-up | 20 | 0 | 74 | 3020 |
|  | 15 | Cook-up | 20 | 0 | 10930 | 23340 |
|  | 15 | Instant | 20 | 4 | 5760 | 12650 |
| Paselli SA2 | 20 | Cook-up | 4 | 0 | 4110 | 23040 |
|  | 20 | Cook-up | 20 | 0 | 1 | 2290 |
|  | 20 | Instant | 20 | 0 | 10 | 1000 |

[a]GSP = gellable starch product;
[b]cooking up before gelling (cook-up) or mixing gelling agent and water at room temperature (instant).

Example VI

A 20 wt % (d.m. basis) potato starch suspension was heated as described in Example V, then cooled rapidly to room temperature by using a cooling section at the jet-cooker, and stored overnight at room temperature with continuous stirring at 24 rpm in order to crystallise part of the starch. The recrystallised starch suspension was homogenised and fed into a spray-drier to obtain a dry gellable starch product. This product has a spherocrystalline morphology. The gelling properties of this product were evaluated as described in Example V (Table III). (This example demonstrates the manufacture and the gelling properties of a spherocrystalline instant-type gellable starch product.)

TABLE III

| Starch | Conc (%) | Treatment[b] | Storage temp (° C.) | G' (Pa) as function of storage time | | |
|---|---|---|---|---|---|---|
|  |  |  |  | 0 h | 2 h | 16 h |
| GSP[a] | 20 | Cook-up | 20 | 96 | 305 | 1695 |
|  | 25 | Instant | 4 | 60 | 1730 | 29990 |
|  | 25 | Instant | 20 | 41 | 851 | 7240 |

[a]GSP = gellable starch product;
[b]cooking up before gelling (cook-up) or mixing gelling agent and water at room temperature (instant).

Example VII

A 10% suspension in tap water 10° DH of a dry gellable starch product prepared as described in Example VI was heated in an autoclave at 140° C. for 5 minutes. After overnight storage of the resulting solution, a rubber-like non-spreadable gel was obtained. When the described treatment at 140° C. was performed with the dry gellable starch product prepared as described in Example V, a spreadable particle gel was obtained after overnight storage at 20° C. (This example demonstrates the use of spherocrystalline instant-type gellable starch product as a starting material for making rubber-like gels).

Example VIII

Gellable starch products, prepared according to Examples V and VI, were tested for their amylase-digestibility according to the Englyst method (as in the reference cited above), both when mixed with water at ambient temperature and after heating at 100° C. and overnight storage at 20° C. The results are shown in Table IV. (This example demonstrates the presence of amylase-resistant and slowly digestible starch in the gellable starch products, both in instant and in cook-up and store applications).

TABLE IV

| GSP[a] preparation method | Sample treatment | RDS[b] | SDS[b] | RS[b] | Mw[c] (g/mol) |
|---|---|---|---|---|---|
| Example V[d] | Instant | 16.2 | 55.3 | 28.5 | 2 100 000 |
| Example VI |  | 51.0 | 24.4 | 24.6 | 1 800 000 |
| Paselli SA2 |  | 54.3 | 26.4 | 19.3 | 270 000 |
| Example V[d] | Cook/store | 36.8 | 37.0 | 26.2 |  |
| Example VI |  | 46.2 | 29.1 | 24.7 |  |
| Paselli SA2 |  | 49.9 | 31.5 | 18.6 |  |

[a]GSP = gelling starch product;
[b]RDS, SDS, RS are rapidly digestible starch, slowly digestible starch, and amylase-resistant starch, determined according to the method described in Reference 3;
[c]Mw = weight average molecular weight;
[d]sample difficult to disperse.

Example IX

The gellable high-modulus type starch product, prepared as described in Example V, was applied as the sole hydrocolloid in the preparation of a 40% fat spread (light margarine) according to the state of the art. The amount of gellable starch product in the final spread was 5.0 wt % (d.m. basis) with no other added hydrocolloids. The final spread showed good external structure, spreadability, and sticking to knife with no loose water.

Example X

The gellable high-modulus type starch product, prepared as described in Example V, was applied as a caseinate replacer in imitation cheese. An imitation cheese was prepared according to the state of the art, containing as the major components cocoa fat (21.8%), sodium caseinate (22%), gellable starch product (4%), and water (48%), in order to achieve 15% caseinate replacement. The obtained imitation cheese showed good melting and shredding properties.

Example XI

The gellable instant type starch product, prepared as described in Example VI, was applied as a fat replacer in chocolate spread. Gellable starch product (18.7 wt % (d.m. basis)) and soft sugar (10.0%) were mixed with hot chocolate milk, the mixture was treated with a high-speed mixer, then stored at 4° C. to obtain a low-fat chocolate paste with good spreading properties for use on e.g. sandwiches.

Example XII

The gellable instant type starch product, prepared as described in Example VI, was applied as a fat replacer in vanilla ice cream. Evaporated low-fat (4%) milk (52 parts) was diluted with water (14.6 parts). Part of the diluted liquid was added to a composition of gellable starch product (16.7 parts (d.m. basis)) and vanilla sugar (16.7 parts) with stirring. After addition of the remaining liquid, the mixture was agitated to obtain an aerated structure, which was stored at −18° C.

Example XIII

The gellable instant type starch product, prepared as described in Example VI, was applied as a gelling agent and carrageenan replacer in a dairy dessert. An aqueous suspension of gellable starch product (5.1 wt % (d.m. basis) was heated at 140° C. for 5 min and cooled to 80° C., whereafter soft sugar (9.4%), low-fat milk powder (7.8%), and dextrose monohydrate (5.5%) were added. The composition was mixed and stored at 4° C. for at least 24 h to yield a pudding with a rubbery gel type texture, which showed good cutting properties and stability against bleeding.

Example XIV

Starch Films

Films were prepared by casting a 10% solution of gellable high-modulus starch product, prepared according to Example V (dissolved in water at 100° C. or at 120° C.) and drying the cast solution for 2 hours at 80° C. An opaque film was obtained from the starch product dissolved at 100° C., a transparent film was obtained from the starch product dissolved at 120° C. Both films were of food-grade and has moisture barrier properties.

Example XV

Barrier Film on Biscuit

A gellable high-modulus type starch product prepared according to Example V was mixed with water (10 wt % starch) and heated for 10 min. at 120° C. and cooled to 50° C. Thereafter biscuits were coated with the cooled solution by brushing and then dried for 30 min at 90° C.

Moisture barrier properties were measured by storing at 20° C. and 80% RH. Moisture transport was measured by weighing in time. The results were compared with a blanc and with gelatin as a moisture barrier. The results are shown in the following Table V.

TABLE V

| storage time | Absolute increase of weight (grams/biscuit) | | |
|---|---|---|---|
| | Blanc | Gelatine | starch retrogel |
| 1 day | 0.44 | 0.12 | 0.12 |
| 5 days | 0.56 | 0.42 | 0.38 |
| >10 days | 0.6 | 0.52 | 0.5 |

Example XVI

Expansion Improver 30 wt % in water of a starch product according to Example V was heated for 10 min at 120° C. and thereafter dried at 100° C. The resultant product was extruded at 190° C. in oil. A fine porous structure was obtained the expansion factor (thickness after extrusion/before extrusion) was 3.5.

The invention claimed is:

1. Method for preparing a starch product, wherein
    an aqueous starch mixture is provided, the starch containing amylose in a content of more than 5 wt. % and less than 50 wt. % based on the dry substance;
    the starch mixture is heated to a temperature of at least 170° C.; and
    then the starch mixture is dried by spray drying.

2. Method according to claim 1, wherein the starch mixture is heated to a temperature between 175 and 250° C.

3. Method according to claim 2, wherein the starch mixture is heated to a temperature between 180 and 220° C.

4. Method according to claim 1 wherein, after the starch mixture has been heated, at least part of the starch is crystallised during a crystallisation step.

5. Method according to claim 4, wherein during the crystallisation step starch spherulites are formed.

6. Method according to claim 4, wherein the heated starch mixture is cooled to a temperature in the range of 0-100° C. before, during or after the crystallisation.

7. Method according to claim 6, wherein the heated starch mixture is cooled to a temperature in the range of 0-50° C., before, during or after the crystallisation.

8. Method according to claim 1, wherein the temperature of the starch mixture at the start of the drying is at least 170° C.

9. Method according to claim 8, wherein the temperature of the starch mixture at the start of the drying is at least between 180-220° C.

10. Method according to claim 1, wherein the starch mixture is dried after being cooled to a temperature below 170° C.

11. Method according to claim 10, wherein the heated starch mixture is cooled to a temperature in the range of 10-40° C., then stored for at least 30 min. under motion and thereafter dried.

12. Method according to claim 10, wherein the starch mixture is dried after being cooled to a temperature of 100° C. or less.

13. Method according to claim 1, wherein the starch remains uncrystallised until the drying is started.

14. Method according to claim 13, wherein the heated starch mixture is cooled to a set-point temperature between 20 and 220° C. and immediately upon reaching the set-point temperature the starch mixture is dried.

15. Method according to claim 14, wherein the heated starch mixture is cooled to a set-point temperature between 70 and 100° C. and immediately upon reaching the set-point temperature the starch mixture is dried.

16. Method according to claim 1, wherein at least part of the process is carried out continuously.

17. Method according to claim 1, wherein the pH of the starch mixture before heating (as measured at 25° C.) is between 2 and 7.

18. Method according to claim 17, wherein the pH of the starch mixture before heating (as measured at 25° C.) is between 4 and 6.5.

19. Method according to claim 18, wherein the pH of the starch mixture before heating (as measured at 25° C.) is between 5 and 6.

20. Method according to claim 1, wherein the water is tap water, optionally supplemented with one or more additives.

21. Method according to claim 1, wherein the starch is cereal, root or tuber starch.

22. Method according to claim 21, wherein the starch is potato starch.

23. Method according to claim 1, wherein the starch is a chemically, enzymatically or physically modified starch.

24. Method according to claim 1, wherein the amylose content of the starch is between 5 and 45 wt. % based upon the dry substance.

25. Method according to claim 24, wherein the amylose content of the starch is between 10 and 40 wt. % based upon the dry substance.

26. Method according to claim 25, wherein the amylose content of the starch is between 15 and 30 wt % based upon the dry substance.

27. Film comprising a starch product according to claim 1.

28. Method for preparing a starch product, wherein an aqueous starch mixture is provided, the starch containing amylose in a content of more than 5 wt. % and less than 50 wt. % based on the dry substance; and the starch mixture is heated to a temperature of at least 170° C. wherein heating is carried out by continuous cooking in a jet cooker.

29. Starch product in the form of a spreadable thermoreversible gel, comprising starch spherulites.

* * * * *

UNITED STATES PATENT AND TRADEMARK OFFICE
CERTIFICATE OF CORRECTION

| | |
|---|---|
| PATENT NO. | : 7,833,356 B2 |
| APPLICATION NO. | : 10/543002 |
| DATED | : November 16, 2010 |
| INVENTOR(S) | : Albert Jan Jacob Woortman et al. |

It is certified that error appears in the above-identified patent and that said Letters Patent is hereby corrected as shown below:

TITLE PAGE:

Now reads: Item "[74] Attorney, Agent, or Firm – Hoffman & Baron, LLP"

Should read: Item -- [74] Attorney, Agent or Firm – Hoffmann & Baron, LLP --

Signed and Sealed this
Twenty-first Day of June, 2011

David J. Kappos
*Director of the United States Patent and Trademark Office*